US011900596B2

(12) United States Patent
Tang et al.

(10) Patent No.: US 11,900,596 B2
(45) Date of Patent: Feb. 13, 2024

(54) METHOD, DEVICE, AND STORAGE MEDIUM FOR WEAKLY-SUPERVISED UNIVERSAL LESION SEGMENTATION WITH REGIONAL LEVEL SET LOSS

(71) Applicant: Ping An Technology (Shenzhen) Co., Ltd., Shenzhen (CN)

(72) Inventors: Youbao Tang, Bethesda, MD (US); Jinzheng Cai, Bethesda, MD (US); Ke Yan, Bethesda, MD (US); Le Lu, Bethesda, MD (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 324 days.

(21) Appl. No.: 17/479,560

(22) Filed: Sep. 20, 2021

(65) Prior Publication Data
US 2022/0351386 A1  Nov. 3, 2022

Related U.S. Application Data

(60) Provisional application No. 63/174,821, filed on Apr. 14, 2021, provisional application No. 63/174,826, filed on Apr. 14, 2021.

(51) Int. Cl.
*G06T 7/00* (2017.01)
*G06T 7/11* (2017.01)
(Continued)

(52) U.S. Cl.
CPC .......... *G06T 7/0012* (2013.01); *G06F 18/213* (2023.01); *G06F 18/253* (2023.01);
(Continued)

(58) Field of Classification Search
CPC . G06T 7/0012; G06T 3/40; G06T 7/11; G06T 2207/20076; G06T 2207/20081; G06T 2207/20084; G06T 2207/30096; G06T 2207/10081; G06T 2207/20016; G06T 7/10; G06F 18/213; G06F 18/253;
(Continued)

(56) References Cited

U.S. PATENT DOCUMENTS 10,499,857 B1 * 12/2019 Nguyen ................ G06N 3/045
10,650,518 B2 * 5/2020 Ryu .................... G06T 7/0012
2020/0380695 A1 * 12/2020 Zhou ...................... G06T 7/143

* cited by examiner

*Primary Examiner* — Neil R McLean (57) ABSTRACT

The present disclosure provides a computer-implemented method, a device, and a storage medium. The method includes inputting an image into an attention-enhanced high-resolution network (AHRNet) to extract feature maps for generating a first feature map; generating a first probability map which is concatenated with the first feature map to form a concatenated first feature map, and updating the AHRNet using the first segmentation loss; generating a second feature map, and scaling the second feature map to form a third feature map; generating a second probability map which is concatenated with the third feature map to form a concatenated third feature map, and updating the AHRNet using the second segmentation loss; generating a fourth feature map, and scaling the fourth feature map to form a fifth feature map; updating the AHRNet using the third segmentation loss and the regional level set loss; and outputting the third probability map.

19 Claims, 6 Drawing Sheets

(51) Int. Cl.
*G06T 3/40* (2006.01)
*G06F 18/213* (2023.01)
*G06F 18/25* (2023.01)

(52) U.S. Cl.
CPC .................. *G06T 3/40* (2013.01); *G06T 7/11* (2017.01); *G06T 2207/20076* (2013.01); *G06T 2207/20081* (2013.01); *G06T 2207/20084* (2013.01); *G06T 2207/30096* (2013.01); *G06V 2201/03* (2022.01)

(58) Field of Classification Search
CPC .... G06V 2201/03; G06V 10/26; G06V 10/82; G06N 3/0455; G06N 3/0464; G06N 3/08
USPC .......................................................... 382/128
See application file for complete search history.

METHOD, DEVICE, AND STORAGE MEDIUM FOR WEAKLY-SUPERVISED UNIVERSAL LESION SEGMENTATION WITH REGIONAL LEVEL SET LOSS

CROSS-REFERENCE TO RELATED APPLICATIONS

This application claims the priority of U.S. Provisional Patent Application Nos. 63/174,826 and 63/174,821, both filed on Apr. 14, 2021, the entire content of which is incorporated herein by reference.

FIELD OF THE DISCLOSURE

The present disclosure generally relates to the field of lesion segmentation technology and, more particularly, relates to a method, a device, and a storage medium for weakly-supervised universal lesion segmentation.

BACKGROUND

Based on global cancer statistics, 19.3 million new cancer cases and almost 10.0 million cancer deaths occurred in 2020. Cancer is one of the critical leading causes of death and a notorious barrier to increasing life expectancy in every country of the world. To assess cancer progress and treatment responses, tumor size measurement in medical imaging and its follow-ups is one of the most widely accepted protocols for cancer surveillance. In current clinical practice, most of these measurements are performed by doctors or radiology technicians, which is time-consuming and often suffers from large inter-observer variations, especially with the growing cancer incidence. Automatic or semi-automatic lesion size measurement approaches are in need to alleviate doctors from such tedious clinical load, and more importantly, to significantly improve assessment consistency. Many efforts have been developed for automating lesion size measurement. Specifically, deep convolutional neural networks are successfully applied to segment tumors in brain, lung, pancreas, liver, enlarged lymph node, and the like. Most of these approaches are specifically designed for a certain lesion type. Therefore, there is a need to develop an effective and accurate weekly-supervised universal lesion segmentation method which is capable of handling a variety of lesions.

BRIEF SUMMARY OF THE DISCLOSURE

One aspect or embodiment of the present disclosure provides a lesion segmentation method for medical images. The method includes inputting an image into an attention-enhanced high-resolution network (AHRNet) to extract feature maps at multiple scales; generating a first feature map according to the extracted feature maps; generating a first probability map according to the first feature map, concatenating the first probability map with the first feature map to form a concatenated first feature map, calculating a first segmentation loss based on the first probability map, and updating the AHRNet using the first segmentation loss; generating a second feature map by up-sampling the concatenated first feature map using a deconvolutional layer, and scaling the second feature map to form a third feature map; generating a second probability map according to the third feature map, concatenating the second probability map with the third feature map to form a concatenated third feature map, calculating a second segmentation loss based on the second probability map, and updating the AHRNet using the second segmentation loss; generating a fourth feature map by up-sampling the concatenated third feature map using a deconvolutional layer, and scaling the fourth feature map to form a fifth feature map; generating a third probability map according to the fifth feature map, and calculating a third segmentation loss and a regional level set loss based on the third probability map; and updating the AHRNet using the third segmentation loss and the regional level set loss, and outputting the third probability map.

Another aspect or embodiment of the present disclosure provides a segmentation device for medical images. The device includes a memory, containing a computer program stored thereon; and a processor, coupled with the memory and configured, when the computer program being executed, to perform a method including: inputting an image into an attention-enhanced high-resolution network (AHRNet) to extract feature maps at multiple scales; generating a first feature map according to the extracted feature maps; generating a first probability map according to the first feature map, concatenating the first probability map with the first feature map to form a concatenated first feature map, calculating a first segmentation loss based on the first probability map, and updating the AHRNet using the first segmentation loss; generating a second feature map by up-sampling the concatenated first feature map using a deconvolutional layer, and scaling the second feature map to form a third feature map; generating a second probability map according to the third feature map, concatenating the second probability map with the third feature map to form a concatenated third feature map, calculating a second segmentation loss based on the second probability map, and updating the AHRNet using the second segmentation loss; generating a fourth feature map by up-sampling the concatenated third feature map using a deconvolutional layer, and scaling the fourth feature map to form a fifth feature map; generating a third probability map according to the fifth feature map, and calculating a third segmentation loss and a regional level set loss based on the third probability map; and updating the AHRNet using the third segmentation loss and the regional level set loss, and outputting the third probability map.

Another aspect or embodiment of the present disclosure provides a non-transitory computer-readable storage medium, storing program instructions configured to be executable by a computer to cause the computer to implement operations comprising: inputting an image into an attention-enhanced high-resolution network (AHRNet) to extract feature maps at multiple scales; generating a first feature map according to the extracted feature maps; generating a first probability map according to the first feature map, concatenating the first probability map with the first feature map to form a concatenated first feature map, calculating a first segmentation loss based on the first probability map, and updating the AHRNet using the first segmentation loss; generating a second feature map by up-sampling the concatenated first feature map using a deconvolutional layer, and scaling the second feature map to form a third feature map; generating a second probability map according to the third feature map, concatenating the second probability map with the third feature map to form a concatenated third feature map, calculating a second segmentation loss based on the second probability map, and updating the AHRNet using the second segmentation loss; generating a fourth feature map by up-sampling the concatenated third feature map using a deconvolutional layer, and scaling the fourth feature map to form a fifth feature map;

generating a third probability map according to the fifth feature map, and calculating a third segmentation loss and a regional level set loss based on the third probability map; and updating the AHRNet using the third segmentation loss and the regional level set loss, and outputting the third probability map.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference may be made in detail to exemplary embodiments of the disclosure, which are illustrated in the accompanying drawings. Wherever possible, same reference numbers may be used throughout the drawings to refer to same or like parts.

While examples and feature maps of disclosed principles are described herein, modifications, adaptations, and other implementations may be possible without departing from the spirit and scope of the disclosed embodiments. Also, the terms "comprise", "have", "contain", "include", and other similar forms may be intended to be equivalent in meaning and be interpreted as open ended, such that an item or items following any one of these words may not be meant to be an exhaustive listing of the item or items, or meant to be limited to only the listed item or items. And the singular forms "a", "an", and "the" may be intended to include plural references, unless the context clearly dictates otherwise.

Various embodiments of the present disclosure provide a method, a device, and a storage medium for weakly-supervised universal lesion segmentation with regional level set (RLS) loss. The weakly-supervised universal lesion segmentation with the RLS loss is described in detail according to various embodiments of the present disclosure hereinafter.

In the present disclosure, a universal lesion segmentation (ULS) method is provided to measure tumor sizes accurately on selected computed tomography (CT) cross sectional images, as defined by response evaluation criteria in solid tumors (RECIST) guideline. The ULS method may be developed via leveraging a sophisticated network architecture and an effective weakly-supervised learning strategy. On one hand, more sophisticated network backbones allow the ULS to have larger model capacities to cope with lesions with various appearances, locations and sizes. On the other hand, weakly-supervised learning strategy may drastically simplify the annotation complexity that permits large amounts of bookmarked cancer images to be used for model initialization. In weakly-supervised learning, the RLS loss may be used as the key component to refine segment regions near lesion boundaries so as to improve the quality of segmentation supervisory signal. The lesion size measurement may be formulated as a two dimensional region segmentation problem, which performs dense pixel-wise classification on RECIST-defined CT axial slices. Such region segmentation based tumor size, area or volume assessment should perform more accurately in measuring solid tumor's response than lesion diameters. To precisely delineate the tumor boundary, three main contributions may be achieved in ULS: 1) an effective network architecture (attention-enhanced high-resolution network AHRNet) based on HRNet that renders rich high-resolution representations with strong position sensitivity, by being augmented with the decoder and the novel attention mechanism combining both dual attention and scale attention; 2) the RLS loss as a reformulated deep learning based level set loss with specific modifications for lesion segmentation; and 3) the AHRNet and the RLS loss integrated within a simple and effective weakly-supervised training strategy such that the AHRNet method (e.g., model) can be trained on large-scale PACS stored lesion databases, such as DeepLesion.

The objective of the present disclosure is to produce reliable and accurate lesion masks on given lesion images. It is assumed that the lesion sub-images have been obtained in the form of bounding boxes that could be either automatically generated by lesion detection approaches or semi-automatically drawn by radiologists.

Figure 1:
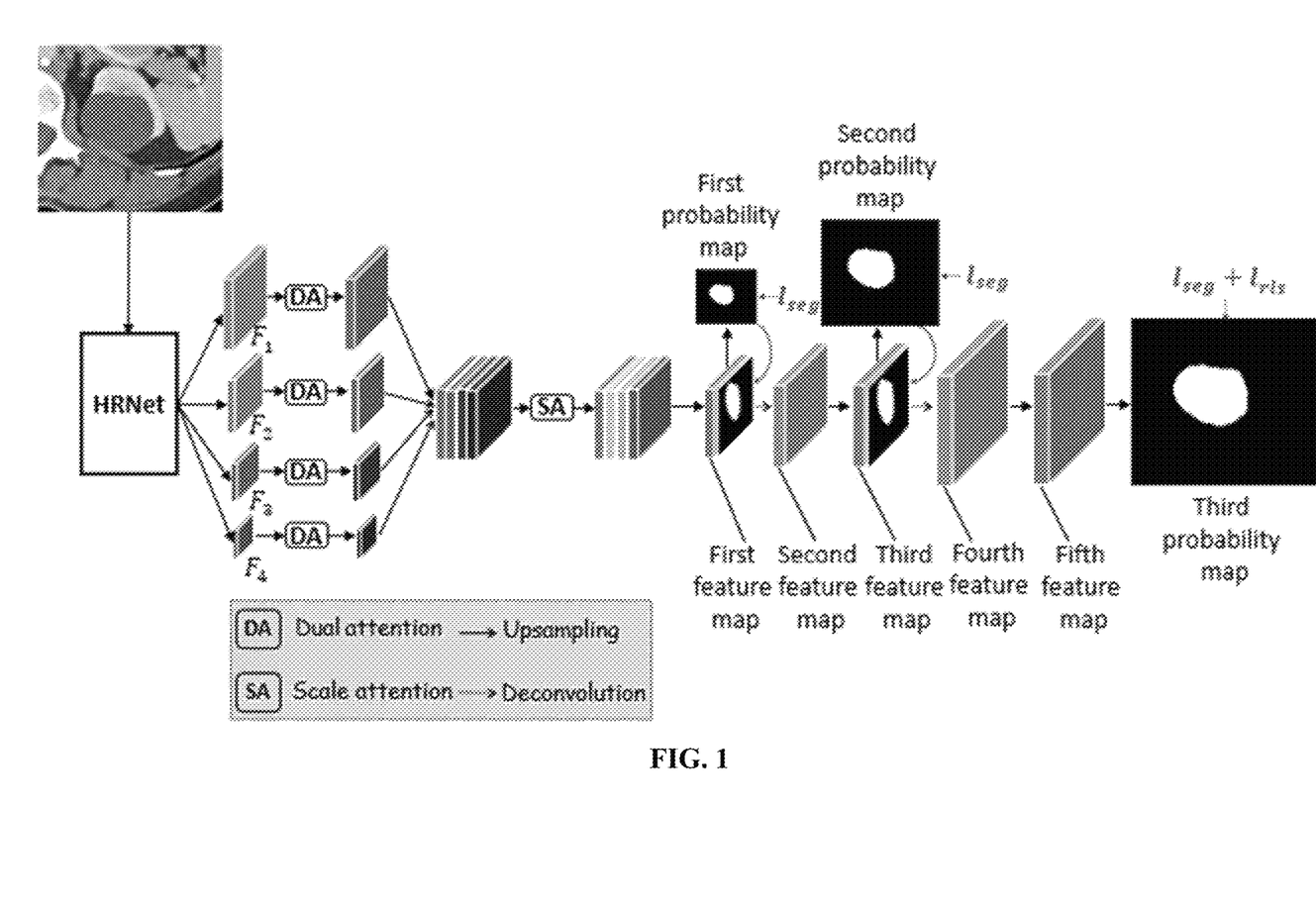
FIG. 1 illustrates an exemplary configuration diagram of a lesion segmentation method including an attention-enhanced high-resolution network (AHRNet) according to various disclosed embodiments of the present disclosure.

FIG. 1 illustrates an exemplary configuration diagram of a lesion segmentation method including the AHRNet according to various disclosed embodiments of the present disclosure.

The AHRNet method (e.g., framework) is described in detail according to various embodiments of the present disclosure. The AHRNet may include a HRNet, one or more of dual attention (DA) modules, and one or more scale attention (SA) modules. The HRNet has been demonstrated of achieving desirable performance in a wide range of computer vision applications, including semantic segmentation, object detection, and human pose estimation, which suggests that the HRNet may be a strong versatile CNN backbone. The HRNet may connect high and low resolution convolutions in parallel, maintain high resolution through the whole process, and fuse multi-resolution representations repeatedly, rendering rich hierarchical, high-resolution representations with strong position sensitivity. The above-mentioned characteristics of the HRNet are crucial for pixel-wise dense prediction tasks. Therefore, the HRNet is chosen as the backbone to extract rich multi-scale feature maps (e.g., each feature map including corresponding features) for lesion segmentation in the present disclosure.

Referring to FIG. 1, given a CT image $I \in \mathbb{R}^{H \times W}$ (H denotes the height of the image, and W denotes the width of the image), the HRNet may produce stacked multi-scale image feature maps:

$$F = \left\{ F_k \in \mathbb{R}^{2^{k+4} \times \frac{H}{2^{k+1}} \times \frac{W}{2^{k+1}}} \mid k \in \{1, 2, 3, 4\} \right\}$$

A straightforward means of lesion segmentation may be to up-sample $F_i$ to have a same resolution (e.g., ¼ of the input image), concatenate $F_i$, and follow a convolutional layer with a 1×1 kernel to obtain the prediction, which may serve as the baseline. The resolution of deep image feature maps is important for accurate lesion segmentation, especially for small lesions. Thus, to obtain more accurate predictions, a small decoder (DE) may be set up to obtain higher resolution feature maps. In some embodiments, the decoder disclosed herein may be a hardware decoder or a hardware/software decoder. Referring to FIG. 1, the decoder may contain two deconvolutional layers with 32 4×4 kernels and a stride of 2, and further include three convolutional layers with 32 3×3 kernels, where the dimensions of feature maps are ¼, ½ and 1 of the input image, respectively. Another three convolutional layers with a 1×1 kernel may be added to obtain corresponding predictions. Each deconvolutional layer may take as input one or more feature maps and probability map prediction.

Figure 2:
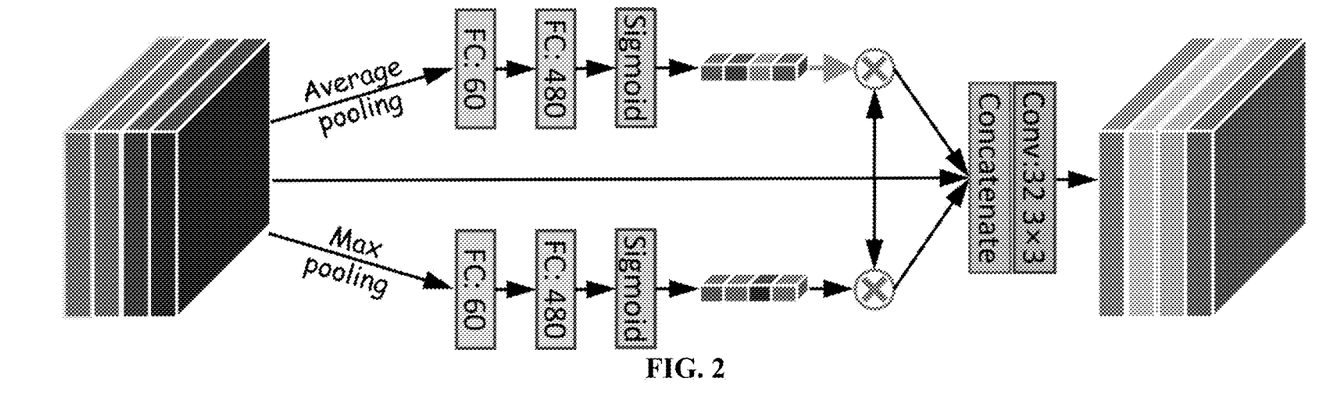
FIG. 2 illustrates an exemplary scale attention (SA) module according to various disclosed embodiments of the present disclosure.

As described above, long-range dependencies of feature maps in $F_i$ for lesion segmentation may not be modeled. However, long-range contextual information may be crucial in obtain precise predictions. In the existing technology, the dual attention (DA) module that can capture the long-range contextual information over local feature representations in spatial and channel dimensions respectively may be used. In the present disclosure, the global contextual information in $F_i$ may be modeled by employing the DA module to adaptively aggregate their rich long-range contextual dependencies in both spatial and channel dimensions, and enhancing feature representations to improve the performance of lesion segmentation. Since studied lesion sizes are significantly diverse, to better address lesion segmentation under different scales, the scale attention (SA) module may be configured to effectively combine multi-scale feature maps by treating them input-specifically with learnable scale attention vectors. FIG. 2 illustrates an exemplary scale attention (SA) module according to various disclosed embodiments of the present disclosure. The SA module may contain two branches which are built upon squeeze-and-excitation (SE) block, as shown in FIG. 2.

According to various embodiments of the present disclosure, the RLS loss is described in detail herein. A level set approach may be used for image segmentation, treating segmentation as an energy minimization problem. The energy function may be defined as:

$$E(c_1, c_2, \phi) = \mu \cdot \text{Length}(\phi) + \nu \cdot \text{Area}(\phi) + \lambda_1 \sum_{i \in I} |q(i) - c_1|^2 H(\phi(i)) + \lambda_2 \sum_{i \in I} |q(i) - c_2|^2 (1 - H(\phi(i))) \quad (1)$$

where $\mu$, $\nu$, $\lambda_1$ and $\lambda_2$ are predefined non-negative hyperparameters, q(i) is the intensity of a pixel i (e.g., a corresponding image location), $\phi(.)$ is a level set function, Length ($\phi$) and Area($\phi$) are regularization terms with respect to the length and the inside area of a contour, $c_1$ and $c_2$ represent mean pixel intensities of inside and outside areas of the contour, and H is a Heaviside function: $H(\phi(i))=1$, if $\phi(i) \geq 0$; and $H(\phi(i))=0$ otherwise.

In the existing technology, such energy function may be integrated into deep learning frameworks for semantic segmentation and medical image segmentation. Some approaches in the existing technology may replace the original image I in equation (1) with a binary image that is reconstructed from the ground truth mask of each object; and other approaches may compute a cross-entropy loss between the outputs of equation (1) when setting $\phi$ as the prediction and ground truth. However, the above-mentioned formulation may not be applied for the present disclosure due to the lack of ground truth masks of lesions for training. Therefore, based on equation (1), the RLS loss which is introduced in the present disclosure may be defined by:

$$\ell_{rls} = \frac{1}{|I'|} \sum_{i \in I'} \left[ \lambda_1 \cdot p(i) \cdot |q(i) - c_1|^2 + \lambda_2 \cdot (1 - p(i)) \cdot |q(i) - c_2|^2 \right] \quad (2)$$

where p(i) is the (predicted) probability value of the pixel i, I' is the constrained region of the input image I, and |I'| is the number of pixels in I'. In one embodiment, it may experimentally set: $\lambda_1=1$ and $\lambda_2=3$. Herein, terms of Length ($\phi$) and Area($\phi$) in equation (2) have been removed because they are sensitive to object sizes (which may vary greatly in the present disclosure).

Figure 3:
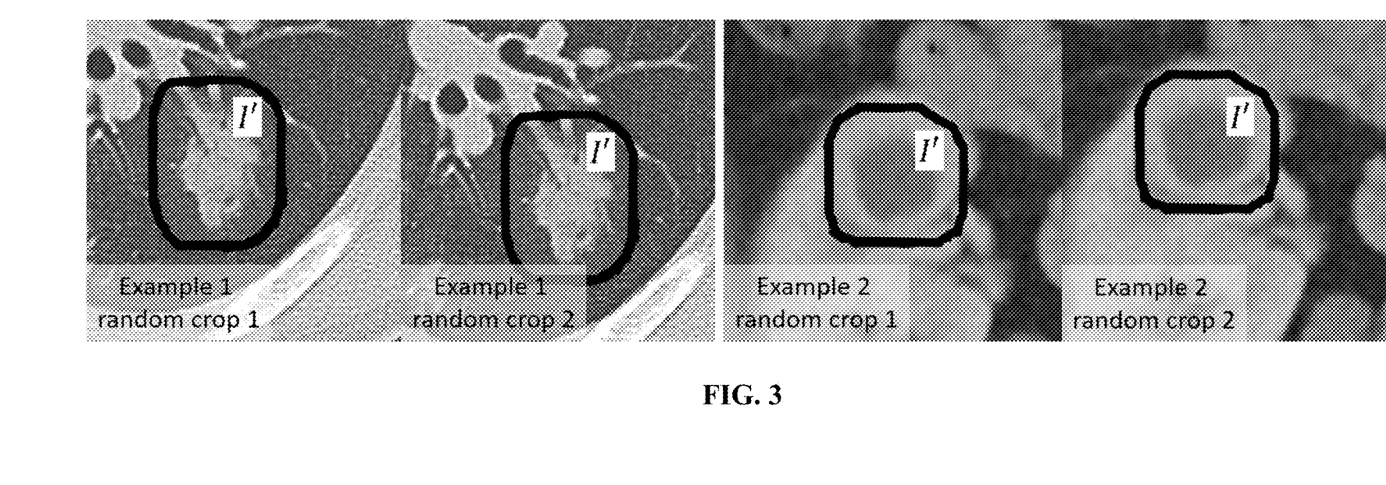
FIG. 3 illustrates examples of using lesion-adaptive regions for regional level set loss computation according to various disclosed embodiments of the present disclosure.

According to various embodiments of the present disclosure, during the training process, it may first obtain a lesion pseudo mask g that is an ellipse for the given lesion image, fitted from four endpoints of its RECIST annotation, then construct the constrained region I' by dilating g to four times its size so that I' is lesion-adaptive.

FIG. 3 illustrates examples of using lesion-adaptive regions for RLS loss computation according to various disclosed embodiments of the present disclosure. FIG. 3 shows two examples, where the constrained region I' is labeled. It can be noted that, for the same lesion, the size of I' remains stable under different data augmentations, for example, randomly cropping and rotating.

According to various embodiments of the present disclosure, model optimization is described in detail herein. Referring to FIG. 1, AHRNet may take as input a CT image and output three probability maps (denoted as $p_1$, $p_2$, and $p_3$). Besides the regional level set loss $\ell_{rls}$, a segmentation loss ($\ell_{seg}$) may also be used to compute the errors between the predicted probability maps and the pseudo masks (denoted as $g_1$, $g_2$, and $g_3$) for optimization. $\ell_{seg}$ may be the summation of a binary cross entropy loss ($\ell_{bce}$) and an IoU loss ($\ell_{iou}$):

$$\ell_{seg} = \Sigma_{k=1}^{3} [\ell_{bce}(p_k, g_k) + \ell_{iou}(p_k, g_k)]$$

The binary cross entropy loss ($\ell_{bce}$) and the IoU loss ($\ell_{iou}$) may be respectively defined as:

$$\ell_{bce}(p, g) = -\frac{1}{|I|} \sum_{i \in I} [g(i) \log(p(i)) + (1 - g(i)) \log(1 - p(i))] \quad (3)$$

$$\ell_{iou}(p, g) = 1 - \left( \sum_{i \in I} g(i) p(i) \right) / \left( \sum_{i \in I} g(i) + p(i) - g(i) p(i) \right)$$

where g(i) denotes a pseudo mask value of the pixel i, and |I| denotes a number of pixels in I. The subscript k of p and g are omitted for simplicity. Although as a pixel-wise loss, $\ell_{bce}$ does not consider the global structure of lesion, $\ell_{iou}$ can optimize the global structure of the segmented lesion rather than focusing on a single pixel.

In order to make $\ell_{rls}$ to provide effective gradients for back propagation, $\ell_{rls}$ may not be added for training until the model converges using only $\ell_{seg}$. It may indicate that the model can produce a desirable quality prediction at its early training stage with $\ell_{seg}$, which could be considered as a desirable initialization for $\ell_{rls}$, $\ell_{rls}$, which is reduced by a factor of about 0.1, may be added at the later training stage such that $\ell_{rls}$ can provide useful gradients for optimization, making the prediction closer to the lesion boundary.

The supervision for training may be the constructed pseudo mask g, and the quality of the constructed pseudo mask may directly affect the final lesion segmentation performance. However, the ellipse estimation may not be guaranteed to always generating lesion masks with high fidelity. Therefore, based on the prediction (probability map) p from the trained model and the fitted ellipse e, an updated pseudo mask g' may be further constructed by setting p∩e as the foreground, p∪e-p∩e as the ignored region, and the rest as the background. With the updated pseudo masks, the model using the same way described above may be retrained; and the training may have converged after three rounds.

Figure 4:
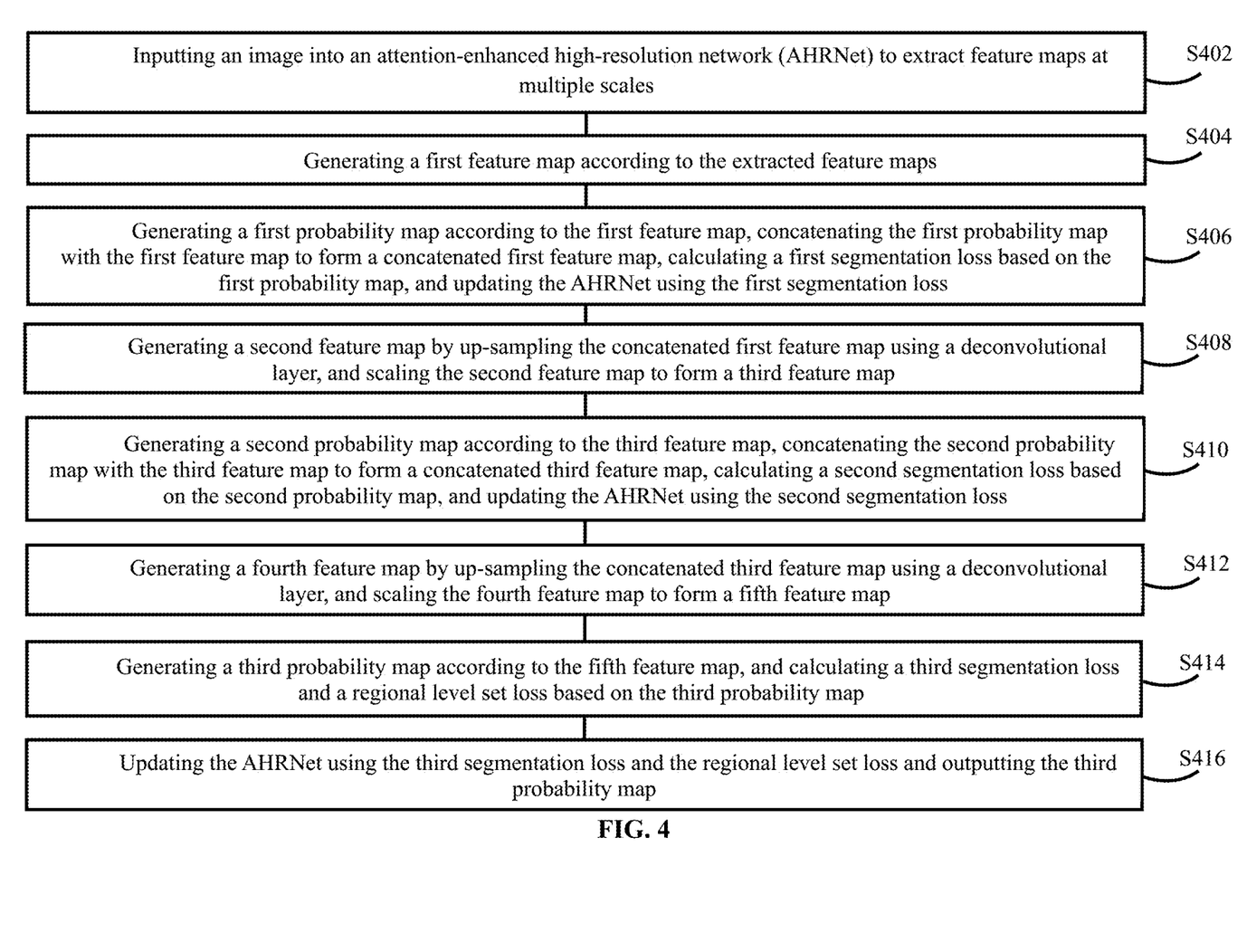
FIG. 4 illustrates a flow chart depicting a lesion segmentation method including an attention-enhanced high-resolution network (AHRNet) according to various disclosed embodiments of the present disclosure.

FIG. 4 illustrates a flow chart depicting a lesion segmentation method including the AHRNet according to various disclosed embodiments of the present disclosure. The lesion segmentation method may include the following steps which are described in detail hereinafter.

At S402, an image may be inputted into an attention-enhanced high-resolution network (AHRNet) to extract feature maps at multiple scales.

At S404, a first feature map may be generated according to the extracted feature maps.

At S406, a first probability map may be generated according to the first feature map, the first probability map may be concatenated with the first feature map to form a concatenated first feature map, a first segmentation loss may be calculated based on the first probability map, and the AHRNet may be updated using the first segmentation loss.

At S408, a second feature map may be generated by up-sampling the concatenated first feature map using a deconvolutional layer, and the second feature map may be scaled to form a third feature map.

At S410, a second probability map may be generated according to the third feature map, the second probability map may be concatenated with the third feature map to form a concatenated third feature map, a second segmentation loss may be calculated based on the second probability map, and the AHRNet may be updated using the second segmentation loss.

At S412, a fourth feature map may be generated by up-sampling the concatenated third feature map using a deconvolutional layer, and the fourth feature map may be scaled to form a fifth feature map.

At S414, a third probability map may be generated according to the fifth feature map; and a third segmentation loss and a regional level set loss may be calculated based on the third probability map.

At S416, the AHRNet may be updated using the third segmentation loss and the regional level set loss, and the third probability map may be outputted.

Figure 5:
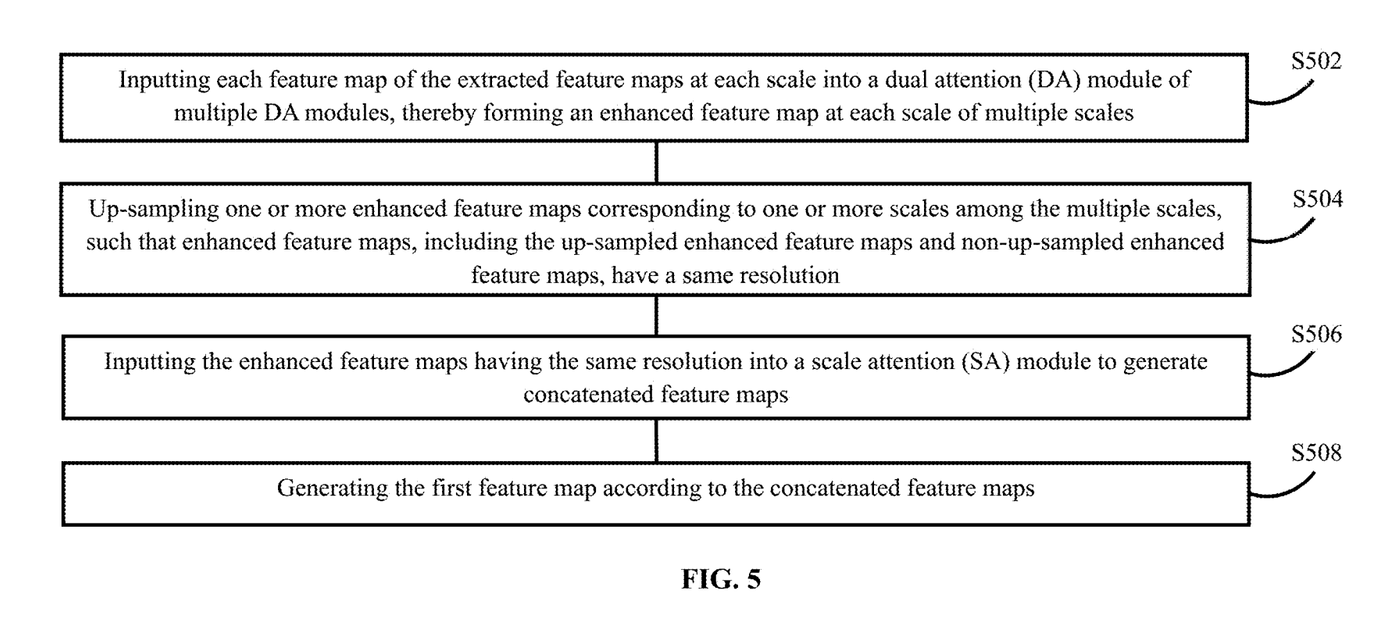
FIG. 5 illustrates a flow chart of sub-steps in S404 of FIG. 4.

FIG. 5 illustrates a flow chart of sub-steps in S404 of FIG. Referring to FIG. 5, according to various embodiments of the present disclosure, S404 for generating the first feature map according to the extracted feature maps may include the following sub-steps which are described in detail hereinafter.

At S502, each feature map of the extracted feature maps at each scale may be inputted into a dual attention (DA) module of multiple DA modules, thereby forming an enhanced feature map at each scale of multiple scales.

At S504, one or more enhanced feature maps corresponding to one or more scales among the multiple scales may be up-sampled, such that enhanced feature maps, including the up-sampled enhanced feature maps and non-up-sampled enhanced feature maps, have a same resolution.

At S506, the enhanced feature maps having the same resolution may be inputted into a scale attention (SA) module to generate concatenated feature maps.

At S508, the first feature map may be generated according to the concatenated feature maps.

In one embodiment, for datasets and evaluation metrics, NIH DeepLesion dataset may include 32735 CT lesion images from 4459 patients, where a variety of lesions over the whole body parts, such as lung nodules, liver lesions, enlarged lymph nodes and the like, are included. Each lesion may have only a RECIST annotation that serves as weak supervision for model optimization. 1000 lesion images from 500 patients may be manually segmented as a test set for quantitative evaluation, and the rest patient data may be used for training. Besides, a hold-out test set may be collected from a collaborated anonymous hospital for external validation. The hold-out test set may contain 470 lesions from 170 patients with pixel-wise manual masks, which also covers various lesion types over the whole body. Furthermore, the precision, recall, and Dice coefficient may be used for performance evaluation.

In one embodiment, the AHRNet may be implemented in PyTorch and its backbone may be initialized with ImageNet pre-trained weights. The AHRNet may be trained using Adam optimizer with an initial learning rate of 0.001 for 80 epochs reduced by 0.1 at epoch 40 and 60. Data augmentation operations may include randomly scaling, cropping, rotating, brightness and contrast adjusting, and Gaussian blurring. After the data augmentation, the long sides of all training images may be randomly resized into a range of [128, 256]. For testing, an image may be taken as input directly if its long side is in the range; otherwise, the image may be resized into the closest bound.

nnUNet is a robust and self-adapting framework on the basis of vanilla UNets, and has been widely used and overwhelmingly successful in various medical image segmentation tasks, suggesting itself as a strong baseline for comparisons. For empirical comparisons, three segmentation methods (e.g., models), including nnUNet, HRNet, and AHRNet, with or without the RLS loss may be trained. Table I lists the quantitative results of different methods and variations on two test sets.

TABLE 1

| Method | DeepLesion test set | | | Hold-out test set | | |
|---|---|---|---|---|---|---|
| | Precision | Recall | Dice | Precision | Recall | Dice |
| nnUNet | 95.5 ± 5.3 | 85.8 ± 8.8 | 90.0 ± 4.9 | 88.2 ± 12.3 | 85.5 ± 13.0 | 85.5 ± 8.7 |
| nnUNet + RLS | 96.8 ± 4.7 | 87.1 ± 8.6 | 91.4 ± 5.7 | 89.8 ± 10.9 | 85.8 ± 10.3 | 86.8 ± 6.9 |
| HRNet | 97.5 ± 3.2 | 84.9 ± 8.6 | 90.5 ± 5.3 | 86.0 ± 13.9 | 88.7 ± 11.7 | 86.0 ± 9.4 |
| HRNet + RLS | 95.0 ± 5.8 | 89.7 ± 9.4 | 91.8 ± 6.2 | 86.9 ± 12.1 | 90.3 ± 10.4 | 87.6 ± 8.1 |
| AHRNet | 97.0 ± 3.7 | 87.0 ± 8.3 | 91.5 ± 5.1 | 88.5 ± 11.3 | 87.7 ± 11.7 | 86.8 ± 6.4 |
| AHRNet + RLS | 95.8 ± 4.5 | 90.2 ± 7.4 | 92.6 ± 4.3 | 89.8 ± 10.0 | 88.3 ± 9.6 | 88.2 ± 6.0 |

Figure 6:
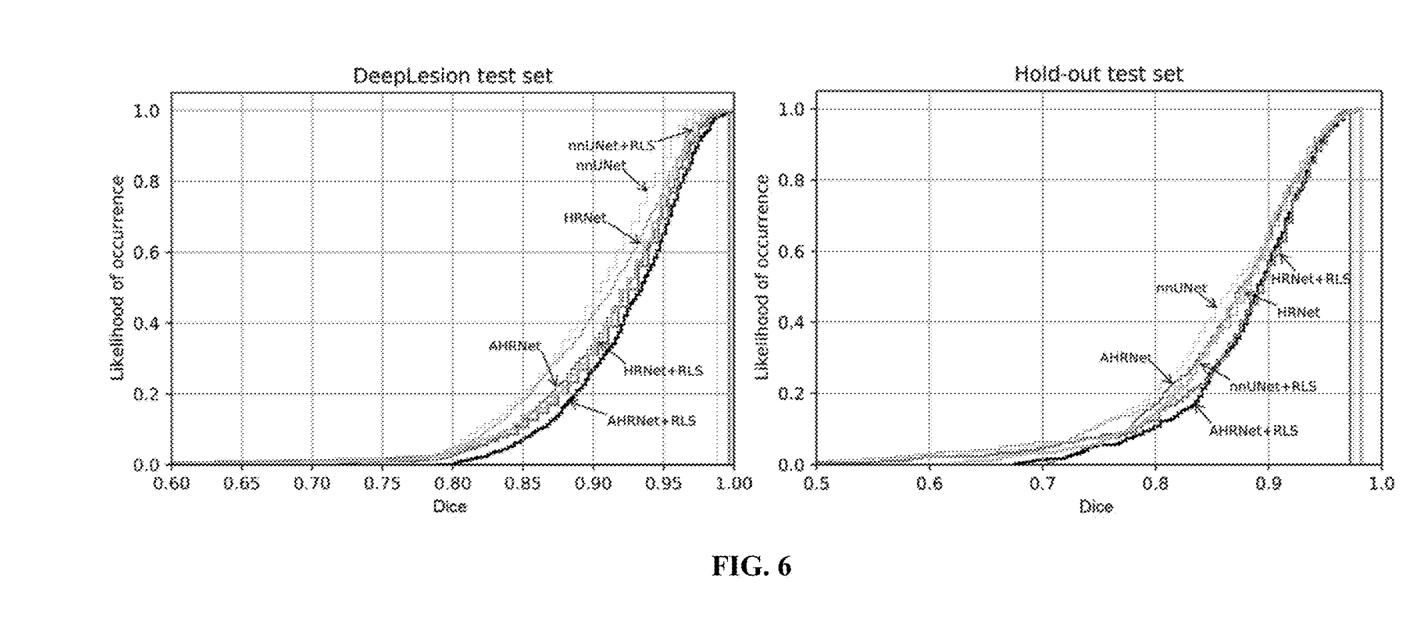
FIG. 6 illustrates exemplary Dice cumulative histograms of different methods according to various disclosed embodiments of the present disclosure.

Referring to Table 1, it may be noted that: 1) the method "AHRNet+RLS" may achieve the highest Dice score of about 92.6% surpassing the best previous work, which demonstrates its effectiveness for weakly-supervised lesion segmentation; 2) when RLS is not used, the AHRNet may still have the best Dice score, indicating that the designed components are effective to enhance the feature representations for lesion segmentation; and 3) for all three methods (e.g., models) including nnUNet, HRNet, and AHRNet, the performance may be consistently and remarkedly improved when using the RLS; the Dice score gains may be about 1.4%, 1.3%, and 1.1%, respectively, which may show that the RLS may be capable of making the segmentation outcome promisingly close to lesion boundaries and may be effectively optimized via a weakly-supervised fashion. FIG. 6 illustrates exemplary Dice cumulative histograms of different methods according to various disclosed embodiments of the present disclosure. The AHRNet method provided in the present disclosure may be observed with about 99% or 90% lesions having Dice score ≥0.8 on the DeepLesion or hold-out test sets, respectively. In addition, FIG. 4 may evidently validate the overall improvements by the AHRNet method provided in the present disclosure.

Figure 7:
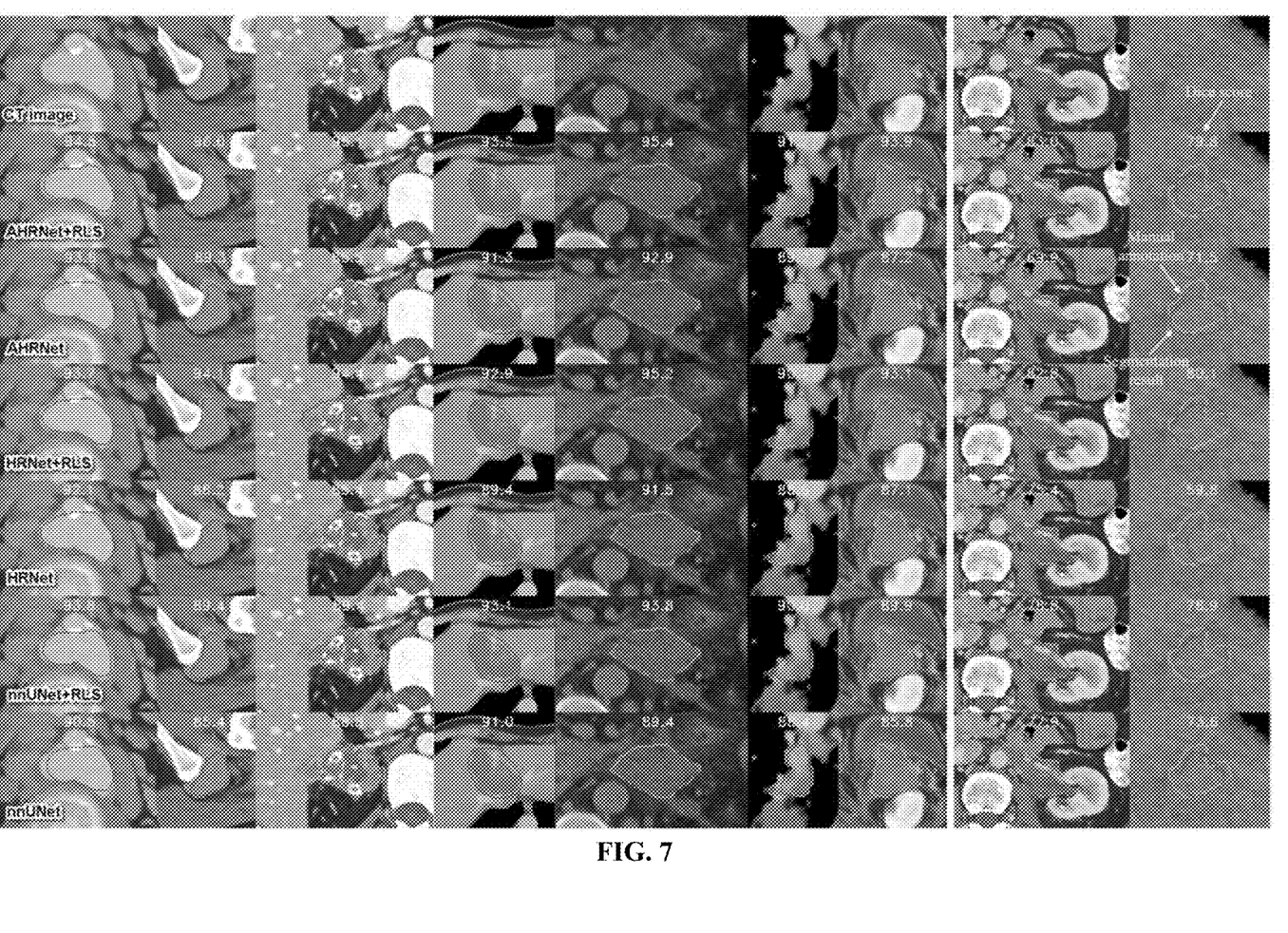
FIG. 7 illustrates exemplary visual examples of results produced by different methods according to various disclosed embodiments of the present disclosure.

FIG. 7 illustrates exemplary visual examples of results produced by different methods according to various disclosed embodiments of the present disclosure. As shown in FIG. 7, the labeled digits indicate Dice scores, and the last two columns provide two failure cases. Referring to FIG. 7, it may be noted that: 1) the lesion segmentation results of the AHRNet method may be closer to the manual annotations than others, suggesting that the AHRNet method has desirable capability to learn more comprehensive feature maps for distinguishing pixels nearby the lesion boundaries; 2) when using the RLS, the results produced by all methods may be closer to the manual annotations than the ones without the RLS; through optimizing the regional level set loss, the methods may push or pull the segmentation results to improve the alignment with lesion boundaries; and 3) when lesions have highly irregular shapes and blurry boundaries, all methods cannot segment them well, as shown in the last two columns of FIG. 7. Beyond the weakly-supervised learning means, using a large number of fully-annotated data for training may alleviate these limitations.

According to various embodiments of the present disclosure, the effectiveness of each configuration may be validated through ablation studies. Table 2 lists quantitative comparisons of using different configurations to construct methods (e.g., models) for lesion segmentation. Referring to Table 2, when gradually introducing these components, including the decoder (DE), the dual-attention module (DA), and the scale attention module (SA), into the baseline (HRNet) sequentially, the performance may also be improved accordingly, which indicates that these design options may be useful to learn more representative feature maps for lesion segmentation. When adding the RLS loss for training, it may bring the largest performance gain (referring to row 4 versus row 6); for example, the Dice score may be improved from about 91.5% to about 92.6%. The RLS importance in the entire method (e.g., framework) may be validated. $\ell_{rls}$ may be calculated using the entire input image rather than the constrained region during training, which is denoted as LS in Table 2. From row 5 and row 6, the RLS may achieve better performance than LS, implying that using the constrained regions for $\ell_{rls}$ computation is more reliable and beneficial for model (e.g., method) optimization.

TABLE 2

| Configurations | Precision | Recall | Dice |
|---|---|---|---|
| (1) Baseline (HRNet) | 97.5 ± 3.2 | 84.9 ± 8.6 | 90.5 ± 5.3 |
| (2) + DE | 95.5 ± 5.8 | 87.7 ± 9.1 | 91.0 ± 5.9 |
| (3) + DE + DA | 95.1 ± 6.1 | 88.4 ± 8.1 | 91.3 ± 5.4 |
| (4) + DE + DA + SA | 97.0 ± 3.7 | 87.0 ± 8.3 | 91.5 ± 5.1 |
| (5) + DE + DA + SA + LS | 96.2 ± 4.3 | 89.4 ± 7.7 | 92.2 ± 4.6 |
| (6) + DE + DA + SA + RLS | 95.8 ± 4.5 | 90.2 ± 7.4 | 92.6 ± 4.3 |

According to various embodiments of the present disclosure, the contributions of the AHRNet method may result in a new segmentation accuracy that outperforms the nnUNet by about 2.6% in averaged Dice score and boosts the segmentation performance on the DeepLesion test set. The AHRNet method may be trained with a large-scale database and generalize desirably on a hold-out test set, outpacing the nnUNet by about 2.7% and achieving about 88.2% (Dice score). Over 92% of the testing lesions may be segmented with >85% Dice scores, demonstrating that the AHRNet method may be a reliable tool for lesion size measurement. The network components, including DE, DA, SA, and RLS, may work seamlessly with different network backbones including the nnUNet, the HRNet, and the AHRNet.

Various embodiments of the present disclosure provide the AHRNet and the RLS loss for accurate weakly-supervised universal lesion segmentation. Instead of directly using the deep image feature maps extracted by the HRNet, the AHRNet may be capable of learning more representative high-resolution feature maps for lesion segmentation by integrating the decoder and attention mechanism. Assisted with the RLS loss, the AHRNet method may further distinguish the pixels nearby the lesion boundaries more accurately. Extensive experimental results may demonstrate that the AHRNet method provided in the present disclosure may bring in desirable and more robust lesion segmentation results; specifically, the RLS may improve the performance significantly.

The present disclosure also provides a segmentation device for medical images. The device includes a memory, containing a computer program stored thereon; and a processor, coupled with the memory and configured, when the computer program being executed, to perform a method including: inputting an image into an attention-enhanced high-resolution network (AHRNet) to extract feature maps at multiple scales; generating a first feature map according to the extracted feature maps; generating a first probability map according to the first feature map, concatenating the first probability map with the first feature map to form a concatenated first feature map, calculating a first segmentation loss based on the first probability map, and updating the AHRNet using the first segmentation loss; generating a second feature map by up-sampling the concatenated first feature map using a deconvolutional layer, and scaling the second feature map to form a third feature map; generating a second probability map according to the third feature map, concatenating the second probability map with the third feature map to form a concatenated third feature map, calculating a second segmentation loss based on the second probability map, and updating the AHRNet using the second segmentation loss; generating a fourth feature map by up-sampling the concatenated third feature map using a deconvolutional layer, and scaling the fourth feature map to form a fifth feature map; generating a third probability map according to the fifth feature map, and calculating a third segmentation loss and a regional level set loss based on the third probability map; and updating the AHRNet using the third segmentation loss and the regional level set loss, and outputting the third probability map.

The present disclosure also provides a non-transitory computer-readable storage medium, storing program instructions configured to be executable by a computer to cause the computer to implement operations comprising: inputting an image into an attention-enhanced high-resolution network (AHRNet) to extract feature maps at multiple scales; generating a first feature map according to the extracted feature maps; generating a first probability map according to the first feature map, concatenating the first probability map with the first feature map to form a concatenated first feature map, calculating a first segmentation loss based on the first probability map, and updating the AHRNet using the first segmentation loss; generating a second feature map by up-sampling the concatenated first feature map using a deconvolutional layer, and scaling the second feature map to form a third feature map; generating a second probability map according to the third feature map, concatenating the second probability map with the third feature map to form a concatenated third feature map, calculating a second segmentation loss based on the second probability map, and updating the AHRNet using the second segmentation loss; generating a fourth feature map by up-sampling the concatenated third feature map using a deconvolutional layer, and scaling the fourth feature map to form a fifth feature map; generating a third probability map according to the fifth feature map, and calculating a third segmentation loss and a regional level set loss based on the third probability map; and updating the AHRNet using the third segmentation loss and the regional level set loss, and outputting the third probability map. According to various embodiments of the present disclosure, a computer program product may include a non-transitory computer-readable storage medium and program instructions stored therein.

While the disclosure has been illustrated with respect to one or more implementations, alterations and/or modifications can be made to the illustrated examples without departing from the spirit and scope of the appended claims. In addition, while a particular feature map of the disclosure has been disclosed with respect to only one of several implementations, such feature map may be combined with one or more other feature maps of the other implementations as may be desired and advantageous for any given or particular function. Furthermore, to the extent that the terms "include", "contain", "have", "has", "with", or variants thereof are used in either the detailed description and the claims, such terms may be intended to be inclusive in a manner similar to the term "comprise". The term "at least one of" may be used to mean one or more of the listed items can be selected.

Notwithstanding that the numerical ranges and parameters setting forth the broad scope of the disclosure are approximations, the numerical values set forth in the specific examples may be reported as precisely as possible. Any numerical value, however, may inherently contain certain errors necessarily resulting from the standard deviation found in their respective testing measurements. Moreover, all ranges disclosed herein may be understood to encompass any and all sub-ranges subsumed therein. In certain cases, the numerical values as stated for the parameter can take on negative values.

Other embodiments of the disclosure may be apparent to those skilled in the art from consideration of the specification and practice of the disclosure disclosed herein. It is intended that the specification and examples may be considered as exemplary only, with a true scope and spirit of the disclosure being indicated by the following claims.

What is claimed is:

1. A lesion segmentation method for medical images, comprising:
    inputting an image into an attention-enhanced high-resolution network (AHRNet) to extract feature maps at multiple scales;
    generating a first feature map according to the extracted feature maps;
    generating a first probability map according to the first feature map, concatenating the first probability map with the first feature map to form a concatenated first feature map, calculating a first segmentation loss based on the first probability map, and updating the AHRNet using the first segmentation loss;
    generating a second feature map by up-sampling the concatenated first feature map using a deconvolutional layer, and scaling the second feature map to form a third feature map;
    generating a second probability map according to the third feature map, concatenating the second probability map with the third feature map to form a concatenated third feature map, calculating a second segmentation loss based on the second probability map, and updating the AHRNet using the second segmentation loss;
    generating a fourth feature map by up-sampling the concatenated third feature map using a deconvolutional layer, and scaling the fourth feature map to form a fifth feature map;
    generating a third probability map according to the fifth feature map, and calculating a third segmentation loss and a regional level set loss based on the third probability map; and
    updating the AHRNet using the third segmentation loss and the regional level set loss, and outputting the third probability map.

2. The method according to claim 1, wherein generating the first feature map according to the extracted feature maps includes:
    inputting each feature map of the extracted feature maps at each scale into a dual attention (DA) module of multiple DA modules, thereby forming an enhanced feature map at each scale of multiple scales:

up-sampling one or more enhanced feature maps corresponding to one or more scales among the multiple scales, such that enhanced feature maps, including the up-sampled enhanced feature maps and non-up-sampled enhanced feature maps, have a same resolution;

inputting the enhanced feature maps having the same resolution into a scale attention (SA) module to generate concatenated feature maps; and generating the first feature map according to the concatenated feature maps.

3. The method according to claim 1, wherein:
the first segmentation loss is calculated according to the first feature map and a corresponding pseudo mask; the second segmentation loss is calculated according to the second feature map and a corresponding pseudo mask; and the third segmentation loss is calculated according to the third feature map and a corresponding pseudo mask, wherein the corresponding pseudo mask is an ellipse for the image, fitted from four endpoints of a response evaluation criteria in solid tumors (RECIST) annotation of the image.

4. The method according to claim 1, wherein the regional level set loss is computed by:

$$\ell_{rls} = \frac{1}{|I'|}\sum_{i \in I'}[\lambda_1 \cdot p(i) \cdot |q(i) - c_1|^2 + \lambda_2 \cdot (1 - p(i)) \cdot |q(i) - c_2|^2]$$

wherein $\lambda_1$ and $\lambda_2$ denote predefined non-negative hyper-parameters, $q(i)$ is an intensity of a pixel i, $c_1$ and $c_2$ denote mean pixel intensities of inside and outside areas of a contour, $p(i)$ denotes a probability value of the pixel i, $I'$ denotes a constrained region of an input image I, and $|I'|$ denotes a number of pixels in $I'$.

5. The method according to claim 1, wherein a segmentation loss is computed, for each of the first, second, and third segmentation losses, by:

$$\ell_{seg} = \ell_{bce}(p,g) + \ell_{iou}(p,g)$$

wherein p denotes a probability map, g denotes a pseudo mask, $\ell_{bce}$ denotes a binary cross entropy loss, and $\ell_{iou}$ denotes an IoU loss.

6. The method according to claim 5, wherein $\ell_{bce}$ and $\ell_{iou}$ are defined as:

$$\ell_{bce}(p, g) = -\frac{1}{|I|}\sum_{i \in I}[g(i)\log(p(i)) + (1 - g(i))\log(1 - p(i))]$$

$$\ell_{iou}(p, g) = 1 - \left(\sum_{i \in I}g(i)p(i)\right) \bigg/ \left(\sum_{i \in I}g(i) + p(i) - g(i)p(i)\right)$$

wherein $p(i)$ denotes a probability value of a pixel i, $g(i)$ denotes a pseudo mask value of the pixel i, and $|I|$ denotes a number of pixels in I.

7. A segmentation device for medical images, comprising:
a memory, containing a computer program stored thereon; and
a processor, coupled with the memory and configured, when the computer program being executed, to perform a method including:

inputting an image into an attention-enhanced high-resolution network (AHRNet) to extract feature maps at multiple scales;

generating a first feature map according to the extracted feature maps;

generating a first probability map according to the first feature map, concatenating the first probability map with the first feature map to form a concatenated first feature map, calculating a first segmentation loss based on the first probability map, and updating the AHRNet using the first segmentation loss;

generating a second feature map by up-sampling the concatenated first feature map using a deconvolutional layer, and scaling the second feature map to form a third feature map;

generating a second probability map according to the third feature map, concatenating the second probability map with the third feature map to form a concatenated third feature map, calculating a second segmentation loss based on the second probability map, and updating the AHRNet using the second segmentation loss;

generating a fourth feature map by up-sampling the concatenated third feature map using a deconvolutional layer, and scaling the fourth feature map to form a fifth feature map;

generating a third probability map according to the fifth feature map, and calculating a third segmentation loss and a regional level set loss based on the third probability map; and updating the AHRNet using the third segmentation loss and the regional level set loss, and outputting the third probability map.

8. The device according to claim 7, wherein generating the first feature map according to the extracted feature maps includes:

inputting each feature map of the extracted feature maps at each scale into a dual attention (DA) module of multiple DA modules, thereby forming an enhanced feature map at each scale of multiple scales;

up-sampling one or more enhanced feature maps corresponding to one or more scales among the multiple scales, such that enhanced feature maps, including the up-sampled enhanced feature maps and non-up-sampled enhanced feature maps, have a same resolution;

inputting the enhanced feature maps having the same resolution into a scale attention (SA) module to generate concatenated feature maps; and generating the first feature map according to the concatenated feature maps.

9. The device according to claim 7, wherein:
the first segmentation loss is calculated according to the first feature map and a corresponding pseudo mask; the second segmentation loss is calculated according to the second feature map and a corresponding pseudo mask; and the third segmentation loss is calculated according to the third feature map and a corresponding pseudo mask, wherein the corresponding pseudo mask is an ellipse for the image, fitted from four endpoints of a response evaluation criteria in solid tumors (RECIST) annotation of the image.

10. The device according to claim 7, wherein the regional level set loss is computed by:

$$\ell_{rls} = \frac{1}{|I'|}\sum_{i\in I'}\left[\lambda_1 \cdot p(i)\cdot|q(i)-c_1|^2 + \lambda_2 \cdot (1-p(i))\cdot|q(i)-c_2|^2\right]$$

wherein $\lambda_1$ and $\lambda_2$ denote predefined non-negative hyperparameters, $q(i)$ is an intensity of a pixel i, $c_1$ and $c_2$ denote mean pixel intensities of inside and outside areas of a contour, $p(i)$ denotes a probability value of the pixel i, I' denotes a constrained region of an input image I, and |I'| denotes a number of pixels in I'.

11. The device according to claim 7, wherein a segmentation loss is computed, for each of the first, second, and third segmentation losses, by:

$$\ell_{seg} = \ell_{bce}(p,g) + \ell_{iou}(p,g)$$

wherein p denotes a probability map, g denotes a pseudo mask, $\ell_{bce}$ denotes a binary cross entropy loss, and $\ell_{iou}$ denotes an IoU loss.

12. The device according to claim 11, wherein $\ell_{bce}$ and $\ell_{iou}$ are defined as:

$$\ell_{bce}(p,g) = -\frac{1}{|I|}\sum_{i\in I}[g(i)\log(p(i)) + (1-g(i))\log(1-p(i))]$$

$$\ell_{iou}(p,g) = 1 - \left(\sum_{i\in I}g(i)p(i)\right)\bigg/\left(\sum_{i\in I}g(i) + p(i) - g(i)p(i)\right)$$

wherein $p(i)$ denotes a probability value of a pixel i, $g(i)$ denotes a pseudo mask value of the pixel i, and |I| denotes a number of pixels in I.

13. The device according to claim 7, further including:
a display screen for displaying the outputted third probability map.

14. A non-transitory computer-readable storage medium, storing program instructions configured to be executable by a computer to cause the computer to implement operations comprising:
inputting an image into an attention-enhanced high-resolution network (AHRNet) to extract feature maps at multiple scales;
generating a first feature map according to the extracted feature maps;
generating a first probability map according to the first feature map, concatenating the first probability map with the first feature map to form a concatenated first feature map, calculating a first segmentation loss based on the first probability map, and updating the AHRNet using the first segmentation loss;
generating a second feature map by up-sampling the concatenated first feature map using a deconvolutional layer, and scaling the second feature map to form a third feature map;
generating a second probability map according to the third feature map, concatenating the second probability map with the third feature map to form a concatenated third feature map, calculating a second segmentation loss based on the second probability map, and updating the AHRNet using the second segmentation loss;
generating a fourth feature map by up-sampling the concatenated third feature map using a deconvolutional layer, and scaling the fourth feature map to form a fifth feature map;
generating a third probability map according to the fifth feature map, and calculating a third segmentation loss and a regional level set loss based on the third probability map; and
updating the AHRNet using the third segmentation loss and the regional level set loss, and outputting the third probability map.

15. The non-transitory computer-readable storage medium according to claim 14, wherein generating the first feature map according to the extracted feature maps includes:
inputting each feature map of the extracted feature maps at each scale into a dual attention (DA) module of multiple DA modules, thereby forming an enhanced feature map at each scale of multiple scales;
up-sampling one or more enhanced feature maps corresponding to one or more scales among the multiple scales, such that enhanced feature maps, including the up-sampled enhanced feature maps and non-up-sampled enhanced feature maps, have a same resolution;
inputting the enhanced feature maps having the same resolution into a scale attention (SA) module to generate concatenated feature maps; and
generating the first feature map according to the concatenated feature maps.

16. The non-transitory computer-readable storage medium according to claim 14, wherein:
the first segmentation loss is calculated according to the first feature map and a corresponding pseudo mask; the second segmentation loss is calculated according to the second feature map and a corresponding pseudo mask; and the third segmentation loss is calculated according to the third feature map and a corresponding pseudo mask, wherein the corresponding pseudo mask is an ellipse for the image, fitted from four endpoints of a response evaluation criteria in solid tumors (RECIST) annotation of the image.

17. The non-transitory computer-readable storage medium according to claim 14, wherein the regional level set loss is computed by:

$$\ell_{rls} = \frac{1}{|I'|}\sum_{i\in I'}\left[\lambda_1 \cdot p(i)\cdot|q(i)-c_1|^2 + \lambda_2 \cdot (1-p(i))\cdot|q(i)-c_2|^2\right]$$

wherein $\lambda_1$ and $\lambda_2$ denote predefined non-negative hyperparameters, $q(i)$ is an intensity of a pixel i, $c_1$ and $c_2$ denote mean pixel intensities of inside and outside areas of a contour, $p(i)$ denotes a probability value of the pixel i, I' denotes a constrained region of an input image I, and |I'| denotes a number of pixels in I'.

18. The non-transitory computer-readable storage medium according to claim 14, wherein a segmentation loss is computed, for each of the first, second, and third segmentation losses, by:

$$\ell_{seg} = \ell_{bce}(p,g) + \ell_{iou}(p,g)$$

wherein p denotes a probability map, g denotes a pseudo mask, $\ell_{bce}$ denotes a binary cross entropy loss, and $\ell_{iou}$ denotes an IoU loss.

19. The non-transitory computer-readable storage medium according to claim 18, wherein $\ell_{bce}$ and $\ell_{iou}$ are defined as:

$$\ell_{bce}(p,g) = -\frac{1}{|I|}\sum_{i\in I}[g(i)\log(p(i)) + (1-g(i))\log(1-p(i))]$$

$$\ell_{iou}(p,g) = 1 - \left(\sum_{i\in I}g(i)p(i)\right) \Big/ \left(\sum_{i\in I}g(i) + p(i) - g(i)p(i)\right)$$

wherein p(i) denotes a probability value of a pixel i, g(i) denotes a pseudo mask value of the pixel i, and |I| denotes a number of pixels in I.

* * * * *